(12) United States Patent
Liao et al.

(10) Patent No.: US 12,446,117 B2
(45) Date of Patent: *Oct. 14, 2025

(54) METHOD AND SYSTEM FOR FORMING A DEVICE NETWORK

(71) Applicant: LEDVANCE GmbH, Garching bei Munchen (DE)

(72) Inventors: Wuqiang Liao, Shenzhen (CN); Yafen Zhang, Shenzhen (CN); Heng Li, Shenzhen (CN); Dengpan Liu, Shenzhen (CN)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,494

(22) Filed: Sep. 11, 2023

(65) Prior Publication Data

US 2023/0421482 A1    Dec. 28, 2023

Related U.S. Application Data

(63) Continuation of application No. 16/995,002, filed on Aug. 17, 2020, now Pat. No. 11,757,758.

(30) Foreign Application Priority Data

Aug. 18, 2019    (CN) .................... 201910761451.X (51) Int. Cl.
*H04W 88/16*    (2009.01)
*H04L 12/66*    (2006.01)
(Continued)

(52) U.S. Cl.
CPC ............. *H04W 88/16* (2013.01); *H04L 12/66* (2013.01); *H04L 41/145* (2013.01);
(Continued)

(58) Field of Classification Search
CPC ....... H04L 12/66; H04L 41/12; H04L 41/145; H04L 45/122; H04L 45/126; H04L 47/125; H04W 16/18; H04W 16/20; H04W 48/20
See application file for complete search history.

(56) References Cited

U.S. PATENT DOCUMENTS

2014/0003233 A1    1/2014    Rune et al.
2014/0105061 A1    4/2014    Kannan
(Continued)

*Primary Examiner* — Pao Sinkantarakorn
*Assistant Examiner* — Pawaris Sinkantarakom
(74) *Attorney, Agent, or Firm* — Hayes Soloway PC (57) ABSTRACT

A method and a system for forming a device network is provided. The method comprises providing a plurality of network devices and a plurality of gateways in a physical environment, collecting position data of the plurality of gateways, selecting a network device out of the plurality of network devices, and selecting a first gateway based on the position data. The method further comprises connecting the network device to the first gateway, if the total number of the network devices connected to the first gateway does not exceed a predefined maximum number of network devices per gateway, and selecting a second gateway based on the position data and connecting the network device to the second gateway, if the total number of the network devices connected to the first gateway exceeds the predefined maximum number of network devices per gateway.

18 Claims, 7 Drawing Sheets

(51) Int. Cl.
*H04L 41/14* (2022.01)
*H04L 45/12* (2022.01)
*H04L 45/122* (2022.01)
*H04W 36/16* (2009.01)
*H04W 48/20* (2009.01)
*H04W 88/08* (2009.01)

(52) U.S. Cl.
CPC .......... *H04L 45/122* (2013.01); *H04L 45/126* (2013.01); *H04W 36/16* (2013.01); *H04W 48/20* (2013.01); *H04W 88/08* (2013.01)

(56) References Cited

U.S. PATENT DOCUMENTS

| | | |
|---|---|---|
| 2016/0037427 A1* | 2/2016 | Lee .................... H04W 36/322 455/437 |
| 2016/0112944 A1* | 4/2016 | Zhou .................... H04W 48/16 370/338 |
| 2017/0111855 A1 | 4/2017 | Cao et al. |
| 2017/0303177 A1 | 10/2017 | Ngounou |
| 2018/0255627 A1* | 9/2018 | Aggarwal ............ H05B 47/196 |
| 2018/0331729 A1* | 11/2018 | Pefkianakis ......... H04B 7/0456 |
| 2019/0362508 A1* | 11/2019 | Anantha ................. G06T 7/292 |
| 2020/0127916 A1 | 4/2020 | Krishan |
| 2020/0162385 A1 | 5/2020 | Thiagarajan et al. |
| 2021/0051079 A1 | 2/2021 | Liao et al. |

\* cited by examiner

METHOD AND SYSTEM FOR FORMING A DEVICE NETWORK

CROSS-REFERENCE TO RELATED APPLICATIONS AND PRIORITY

This patent application is a Continuation of U.S. patent application Ser. No. 16/995,002, filed on Aug. 17, 2020, which claims priority from Chinese Patent Application No. CN 201910761451.X filed Aug. 18, 2019. Each of these patent applications is incorporated by reference herein in its entirety.

TECHNICAL FIELD

The technical field of the present disclosure generally relates to device networks. In particular, the present disclosure relates to a method and a system for forming a device network.

BACKGROUND

There are methods and systems known which may be used for forming and managing device networks. It is also known that devices may be connected to networks controllable by computers. For large networks with a large number of network devices, it may be difficult, however, to form a network, in particular, to properly connect the network devices in order to forming a network.

SUMMARY

An object of the present disclosure is to provide an improved method and system for forming a network.

According to a first aspect, a method for forming a device network is provided. The method comprises providing a plurality of network devices and a plurality of gateways in a physical environment. The plurality, in the present context, may comprise two or any higher number. In particular, the network devices and the gateways may be provided and arranged in the physical environment according to the purpose of the network to be formed. The physical environment may be any environment in which the network devices may be arranged. The physical environment may be, in particular, an indoor or outdoor area, a building, a part of a building, a production hall, an office, or a residential space.

The method further comprises collecting position data of the plurality of gateways. The position data may, in particular, represent the current positions of the gateways in the physical environment.

The position data may be in particular collected with a location device configured to collect position data based on a wireless positioning technology.

The method also comprises selecting a network device out of the plurality of network devices, selecting a first gateway out of the plurality of gateways based on the position data, and connecting the selected network device to the first gateway if the total number of the network devices connected to the first gateway does not exceed a predefined maximum number of network devices per gateway. The method further comprises selecting a second gateway based on the position data and connecting the selected network device to the second gateway if the total number of the network devices connected to the first gateway exceeds the predetermined maximum number.

By taking into account the position data of the gateway devices and the total number of the network devices already connected to the first gateway, the network devices can be allocated or assigned to respective gateways in a self-equalized manner. In particular, by applying the method to differently selected network devices, eventually all network devices of the network can be allocated to one gateway. Due to the self-equalizing, the network device connections and the workload are automatically distributed over the gateways, resulting in an efficient and reliable functioning of the network. The automatic self-equalization allows an easy, cost-saving, and reliable formation of large networks comprising large numbers of network devices and the gateways.

The plurality of network device may comprise any kind of networkable devices, such as smart devices with adjustable parameters. The network devices may also comprise lamps, luminaires, and/or sensors, depending on the specific purpose of the network. The network devices may be also configured to communicate with other smart devices and/or to be part of an internet of things (IoT). The network devices may be configured to be wirelessly controlled, in particular, based on a wireless communication protocol according to Zigbee (registered trademark) to communication with gateways and/or each other. The network devices may be also configured to form groups, in particular, according to pre-defined rules or scenarios automatically. The connection of a network device to a gateway may, in particular, comprise enabling a wireless control of the network device from a computer server over the gateway.

The physical environment may comprise at least one room or zone with one or more network devices arranged in the room, and the method may comprise determining a geometrical center of the at least one room, in particular, based on environment data representing the plan of the room, and calculating distances between the plurality of gateways and the geometrical center of the at least one room, based on the position data of the gateways, wherein a closest available gateway from the geometrical center of the room is selected as the first gateway and a second closest available gateway from the geometrical center of the room is selected as the second gateway. Available gateway, in the present context, means that the gateway is installed in the communication range of the respective network device, to which the network devices can be assigned and connected. By choosing the gateways according to the distance to the center of the room, the gateways can be thus prioritized such that preferentially the closest gateways will be used, resulting in more reliable wireless communication between the network devices and the gateway.

The maximum number of network devices per gateway may be defined based on the total number of network devices and the total number of gateways. In particular, the maximum number of the network devices per gateway may be defined based as the average number of network devices, wherein the average number is the total number of network devices in the entire physical environment divided by the total number of the gateways in the entire physical environment. The maximum number of network devices per gateway may be defined as the average number +1. By defining the maximum number in such manner, it can be ensured that no network device remains unassigned to any of the gateways.

The method may comprise collecting position data of the plurality of network devices, in particular, for determining the positions of the network devices in the physical environment, and calculating a plurality of distances between the network devices and the gateways based on the position data of the network devices and the gateways, wherein the selecting of the first and the second gateways is based on the calculated distances between the network devices and the gateways. By taking into account the distances between the network devices and the gateways, the network devices can be preferentially assigned to the closest gateways, resulting in a reliable communication between the network devices and the gateways.

The closest available gateway from the selected network device may be selected as the first gateway and the second closest available gateway from the selected network device may be selected as the second gateway. By choosing the closest gateways as the first and second gateways, short connections between the network devices and the gateways can be automatically favored, leading to a robust communication between the network devices and the respective gateways.

The method may comprise determining, after selecting the first gateway and prior to selecting the second gateway, the farthest network device which is already connected to the first gateway and replacing the farthest network device by the selected network device if it is determined that the distance between the farthest network device and the first gateway is larger than the distance between the selected network device and the first gateway. Replacing of the farthest network device by the selected network device may comprise unassigning or disconnecting the farthest network device from the first gateway and assigning or connecting the selected network device to the first gateway. By replacing the farthest network device (ND), unnecessarily long connections between the gateway devices and the gateways can be automatically eliminated. Since the longest wireless connections are most prone to distortions, by eliminating the long connections, the overall reliability of the network can be improved.

The method may further comprise collecting device information data representing individual properties of the network devices, wherein the selection of the first gateway and the second gateway is further based on the device information data of the selected network device. By selecting the gateways based on the device information data, the individual properties of the network devices in the network forming, especially in accordance with the specific purpose of the network, can be taken into account. The device information data, representing individual properties of the network devices, may comprise a unique identification number (ID), device type, manufacturer ID, etc. Further, the device information data may represent technical characteristics or specification information relevant for controlling the network devices.

The collecting of the device information data may comprise scanning a QR-code of the at least one network device with a QR-scanner of the location device. The location device can be configured, in particular, as a handheld scanning device or QR-scanner which can be used to scan the QR-codes of the network devices. The scanning of the QR-codes provides an easy and quick way for collecting the device information data from individual network devices.

The method may further comprise providing a model of the physical environment based on environmental data and mapping the network devices to the model of the physical environment based on the physical environment data. The model of the physical environment may be based on environment data, from which a two-dimensional (2D) or three-dimensional (3D) model of the physical environment can be created. The model may be further a 3D model which is constructed on the basis of a 2D model or floor plan of the physical environment. The mapping of the network devices to the model of the physical environment can facilitate the identification and control of the network devices by providing an overview of the device positions in the physical environment. Further, the mapping of specific devices to specific positions in the environment can be especially helpful when the network comprises a large number of network devices which can be easily confused by the user.

The method may comprise creating and/or updating a mapping table with the device information data and the position data of the network devices and the gateways such that the mapping table reflects the current locations of the individual network devices and the gateways in the physical environment. The mapping table reflecting the current locations of the network devices and the gateways can serve as bases for correctly determining the locations and the distances in accordance to the current constellation of the network devices and gateways.

In some embodiments, the plurality of network devices comprises one or more luminaires or lamps, in particular, with at least one adjustable light parameter, such as luminous flux, brightness, luminance, and/or light color temperature. The mapping of the luminaires to the model of the physical environment can provide a clear overview over the locations of the luminaires in the physical environment and thus facilitate the management of the network of the luminaires. The one or more light parameters of the luminaires may be adjusted or equalized in such a way that a desired illumination of the physical environment is achieved.

In some embodiments, the method comprises modelling or simulating the operation of the network devices. In the case of luminaires, the method may comprise modelling an illumination of the physical environment illuminated by the at least one luminaire and displaying a modelled illumination on the UI. The modelled illumination of the physical environment may be displayed together with the model of the physical environment on the UI, giving a realistic model of the illuminated physical environment. Based on the modelled illumination of the physical environment, the at least one light parameter of the luminaire can be adjusted in such a way that a desired illumination of the physical environment is achieved. Thus, a realistic real-time simulation of the operation of the luminaires can be used to visually control and to adjust the luminaires over the UI.

In some embodiments, the device locations in the model of the physical environment may be rearranged, and the physical environment may be modelled with the rearranged locations of the network devices. The rearrangement of the device locations in the model environment can be particularly helpful in finding the optimal positions of the network devices, such that the network devices in the physical environment can be rearranged accordingly.

According to another aspect, a system for forming a device network with a plurality of network devices and a plurality of gateways in a physical environment is provided. The system comprises a computer server with a communication interface configured to send control signals to the gateways for assigning and connecting the network devices to the gateways, a processor, and a memory unit configured to store position data of the gateways, the memory unit being further configured to store instructions executable by the processor to select a network device out of the plurality of network devices, select a first gateway out of the plurality of gateways based on the position data, and to connect the selected network device to the first gateway, if the total number of the network devices connected to the first gateway does not exceed a predefined maximum number of network devices per gateway. The instructions further comprise instructions to select a second gateway based on the position data and connect the selected network device to the second gateway if the total number of the network devices connected to the first gateway exceeds the pre-defined maximum number of network devices per gateway.

By taking into account the position data of the gateway devices and limiting the total number of the network devices connected to the first gateway, the network devices can be allocated or assigned to respective gateways in a self-equalized manner.

The system may further comprise a location device for collecting position data for the network devices and the gateways, wherein the location device comprises a processor, a positioning tag configured to collect position data for determining positions of the network devices relative to at least one positioning base provided in the physical environment, a QR-scanner for collecting device information data representing individual properties of the network devices, a communication interface for communicating with a server, and a memory unit configured to store instructions executable by the processor to cause the processor to receive the position data from the positioning tag and the device information data from the QR-scanner and to instruct the communication interface to send the position data and the device information data to the server.

The positioning tag may be configured to wirelessly communicate with the at least one positioning base for determining the position of the positioning tag of the location device. By bringing the location device close to one of the network devices and determining the position of the positioning tag, the position of the respective network device can be determined. The location device may be a compact handheld device which can be easily brought to the network devices. In particular, if the location device is positioned in a distance from a network device which is smaller than the spatial resolution of the determination of the tag location, the precision of the determination of the position of the network device can be limited only by the resolution of the wireless technology underlying tag localization determination.

The wireless communication of the positioning tag with the at least one positioning base may be based on UWB (ultra-wideband) technology. The UWB technology enables a reliable position determination with a high precision. In particular, measurement deviations can be less than 50 cm, which may be sufficiently small for controlling network devices in many outdoor or indoor applications.

The QR-scanner may be configured to collect the device information data by scanning QR-codes of the network devices. The device information, representing individual properties of the network devices, may comprise a unique identification number (ID), device type, manufacturer ID, etc. Further, the device information data may provide technical characteristics or specification information relevant for controlling the network devices. By scanning the QR-codes with the QR-scanner, the device information data can be quickly and easily collected from individual devices.

The instructions executable by the processor may comprise instructions to process the position data received from the positioning tag prior to sending the position data to the computer server. In particular, the processed position data may represent positions calculated from raw position data provided by the positioning tag to the processor of the location device. Thus, the computer server can be provided with already-calculated positions of the network devices. In some embodiments, the instructions executable by the processor may comprise instructions to send the unprocessed position data to the computer server, such that the computation of the network device positions can be performed by the computer server. Thus, the computational power of the processor of the location device can be reduced, resulting in a cheaper and smaller location device.

The computer server may comprise a user interface (UI), in particular, for controlling the gateways and the network devices over the gateways, and the memory unit may be further configured to store instructions executable by the processor to provide a model of the physical environment, in particular, based on environment date, to map the network devices to the model of the physical environment, and to display the model of the physical environment on the UI, the network devices being indicated by icons in the model of the physical environment.

The displaying of the model of the physical environment to which the network devices are mapped provides a good overview which can help to avoid errors or wrong operation, especially if a large number of network devices. The displaying of the model of the physical environment with the icons of the mapped networked devices on the UI makes the control of the network particularly user-friendly and less prone to mistakes.

The UI may comprise an interactive user interface configured to control the network devices by selecting respective icons on the UI. In particular, in some embodiments, the icons can be activated by selection for manually controlling corresponding network devices, providing a particularly user-friendly control interface.

The UI may be further configured to display diagnostic parameters, indicating the operational state of the network devices. In particular, the UI may be configured to display a dashboard showing diagnostic parameters and/or status information of the network. The network status information may comprise status information of individual network devices and/or global status information related to the network as a whole. In particular, the status information may comprise health status information of the network. The health status may comprise the ratio of the number of functioning or offline network devices to the total number of the network devices. In the case of luminaires, the status information of network devices may comprise "on/off" status, brightness, color temperature, etc. The UI may be configured to display a dashboard showing the energy consumption of the network devices, in particular, one or more network devices of the plurality of network devices, and/or the energy consumption summary, in particular, for a room or area, in particular, over a selectable time period. The UI may be further configured to display a dashboard showing the remaining lifetime of the network devices. The UI may be configured to display a dashboard showing predictive maintenance data.

In some embodiments, the system also comprises one or more positioning bases deployable in the physical environment and configured to wirelessly communicate with the positioning tag of the location device for providing positioning data. The positioning bases positioned at known positions in the physical environment can provide a reference system for determining the actual locations of the network devices and the gateways.

The collecting of the position data with the location device may be based on ultra-wideband (UWB) positioning technology. The UWB technology enables an energy-efficient and accurate determination of device position. With the UWB technology, a highly precise determination of the positions of the network devices is possible. In some embodiments, the spatial resolution or the deviation in the position determination is less than 50 cm. This precision is sufficient for many applications. For collecting the position data, other technologies, such as Bluetooth 5.0 (registered trademark) and Wi-Fi (registered trademark), may be used. These technologies are well-standardized and readily available for positioning purposes.

In the following description, details are provided to describe the embodiments of the present disclosure. It shall be apparent to one skilled in the art, however, that the embodiments may be practiced without such details.

BRIEF DESCRIPTION OF THE DRAWINGS

Some parts of the embodiments have similar parts. The similar parts may have same names or similar part numbers. The description of one part applies by reference to another similar part, where appropriate, thereby reducing repetition of text without limiting the disclosure.

DETAILED DESCRIPTION

Figure 1:
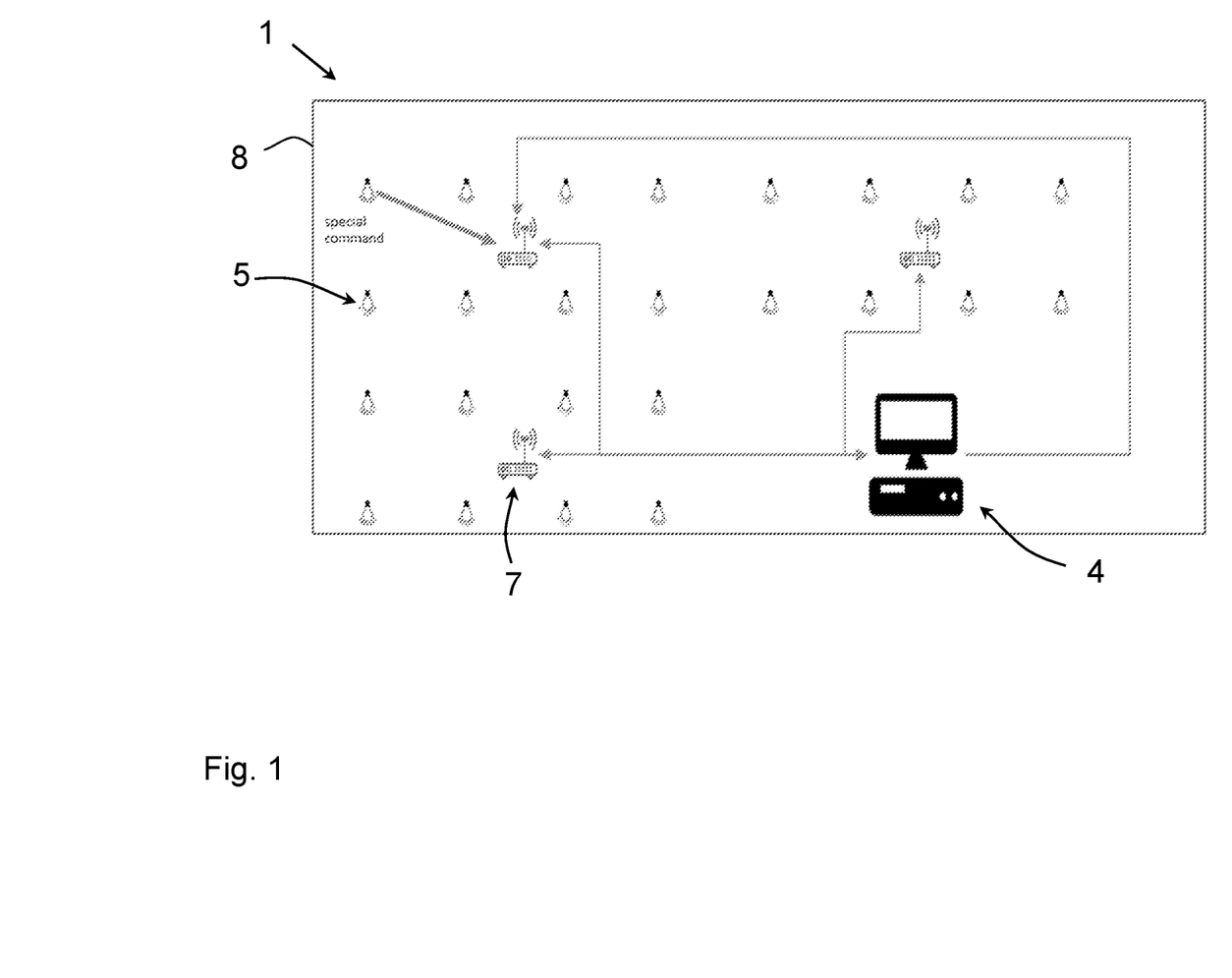
FIG. 1 shows a schematic view of a network system for forming a network according to an embodiment.

FIG. 1 shows a schematic view of a network system for forming a network according to an embodiment. The network system 1 comprises a plurality of network devices 5, a number of gateways 7, and a computer server 4 for controlling the network devices 5 over the gateways 7. The network devices 5 are deployed in a physical environment 8 and are configured to receive control signals from the computer server 4 over the gateways 7.

In the exemplary embodiment of FIG. 1, the network devices 5 are lamps in the form of dimmable LED light bulbs, and the physical environment 8 is an office area or landscaped office in which the plurality of the network devices 5 is deployed. The dimmable light bulbs are remotely controllable such that luminous flux, brightness, and color temperature of the light emitted from the light bulb can be adjusted. For controlling the LED light bulbs, a wireless communication according to Zigbee (registered trademark) standard can be used. The network 1 may also comprise other kind of controllable network devices (e.g., luminaires, loudspeakers, heaters, coolers, or any other network device with wirelessly adjustable parameters). In some embodiments, the network devices 5 are further configured to send out signals to other devices and to actively participate in the internet of things (IoT).

For creating a functional network out of the elements of the network system 1 shown in FIG. 1, a communication between the network devices 5 and the server 4 over the gateway must be established. Therefore, each network device participating in the network may be assigned to and connected with a specific gateway 7, as illustrated in FIG. 1 by the thick solid arrow extending between one network device 5 and one gateway 7. The communication between the computer server 4 and the gateways 7 are schematically showed as solid lines with double arrows extending between the computer server 4 and the gateways 7.

Figure 2:
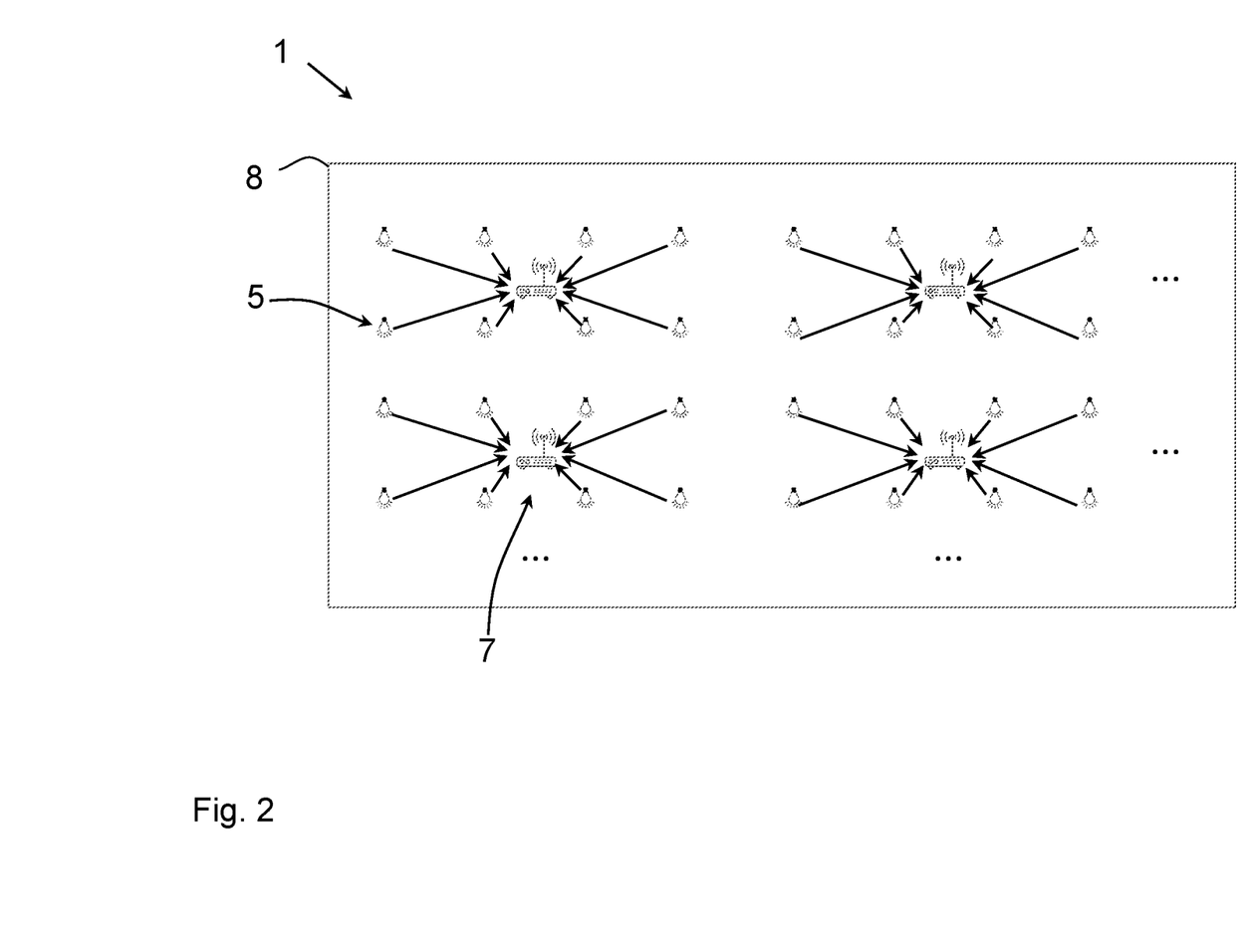
FIG. 2 shows a network formed out of the network system of FIG. 1.

FIG. 2 shows schematically a network formed out of the network system of FIG. 1. According to FIG. 1, the network is formed by assigning the network devices 5 to respective gateways 7 such that the network devices 5 can be controlled by the server 4 over the gateways 7. The assignment of the network devices 5 to respective gateways 7 is visualized with arrows extending from the network devices 5 to the gateways 7. For the sake of simplicity, the computer server 4 and the communication between the computer server 4 and the gateways 5 are not shown in FIG. 2.

Figure 3:
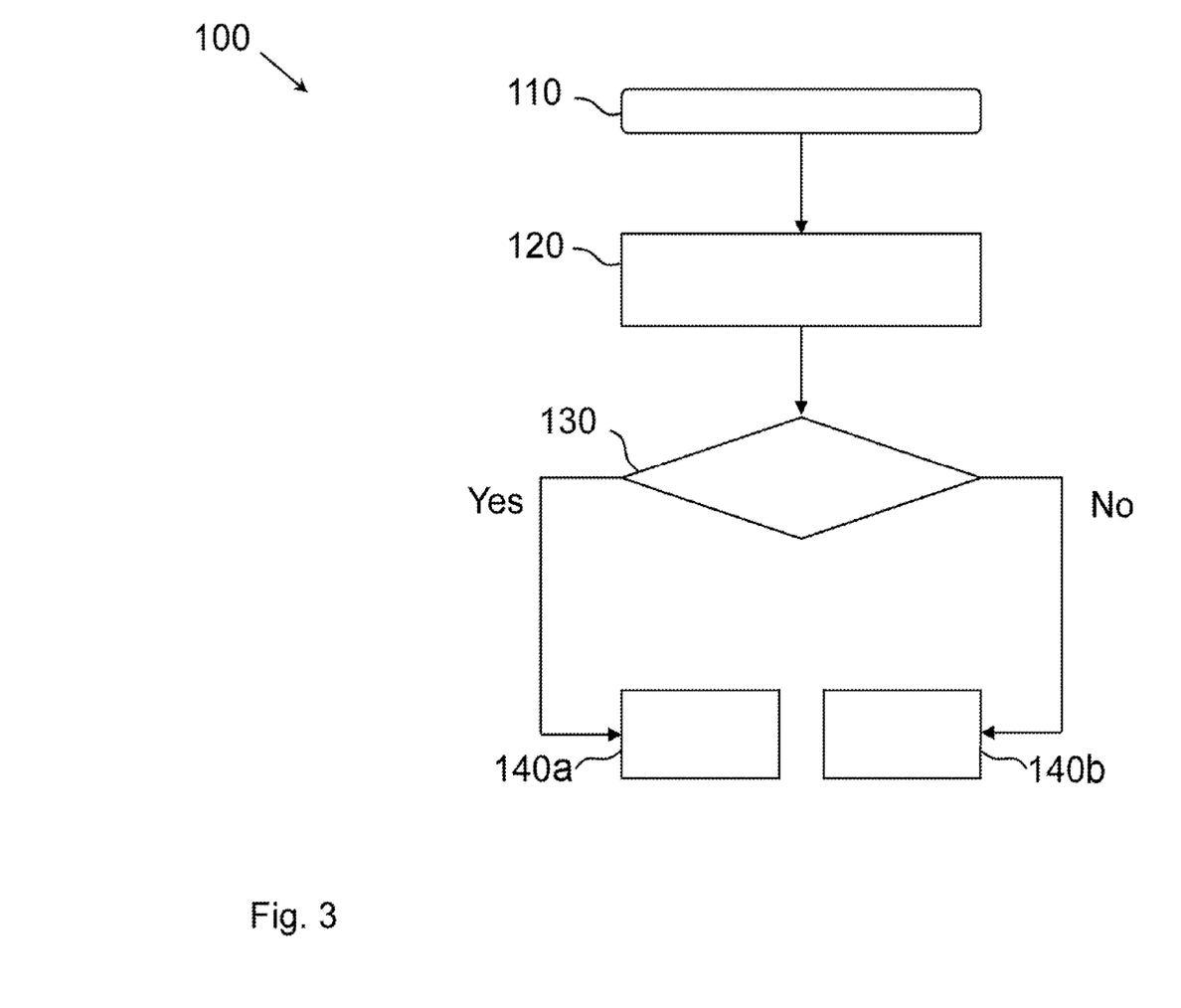
FIG. 3 shows a flow chart of a method for mapping a device network according to an embodiment.

FIG. 3 shows a flow chart of a method for mapping a device network according to an embodiment.

The method 100 for device mapping comprises a step 110 of collecting position data of a specific network device 5 out of the plurality of network devices 5. The device position data may, in particular, comprise cartesian coordinates (X, Y, Z) of the network device 5 in the physical environment 8.

In step 120, the specific network device 5 is assigned to a specific location in a model of the physical environment 8. The model of the physical environment 8 may be a computer-aided design (CAD) drawing of the physical environment, in particular, a floor plan of an office area. The assigning of the network device 5 to a specific location may comprise capturing device information data for the specific network device 5 and assigning the device information data to the specific location in the CAD drawing, corresponding to the real location of the device in the physical environment. The device information data may comprise a unique identification number (ID) or media access control (MAC) address of the specific network device 5.

The position data and the device information data may be provided by a location device configured to determine the location, in particular, with respect to positioning bases provided in the physical environment, in particular, based on the ultra-wideband (UWB) positioning technology. The location device may comprise a QR-scanner for scanning QR-codes of the network devices 5.

In step 130, which is a decision diamond, it is checked whether the device information data (e.g., device ID) of the current device already exists in a mapping table.

In step 130, if it is determined that the unique ID already exists in the mapping table, then in step 140a the existing entry in the mapping table is modified, if necessary, in particular, the location data of the network device 5, representing the location of the network device 5 in the model of the physical environment 8, may be modified such that the location corresponds to the current location of the network device 5 in the real physical environment 8.

If it is determined in step 130 that there is no entry with the same device information date or ID number in the mapping table, then in step 140b the mapping table is accordingly updated by adding a new entry comprising the location data and the device information data of the specific network device 5.

The steps 110 to 130 may be repeated for different network devices 5. In particular, the steps 110 to 130 may be repeated for each of the network devices 5 such that the mapping table reflects the current locations of all network devices 5 in the physical environment 8. In some embodiments, the position data of the gateways 7 are also collected and saved in the mapping table in the similar manner.

Figure 4:
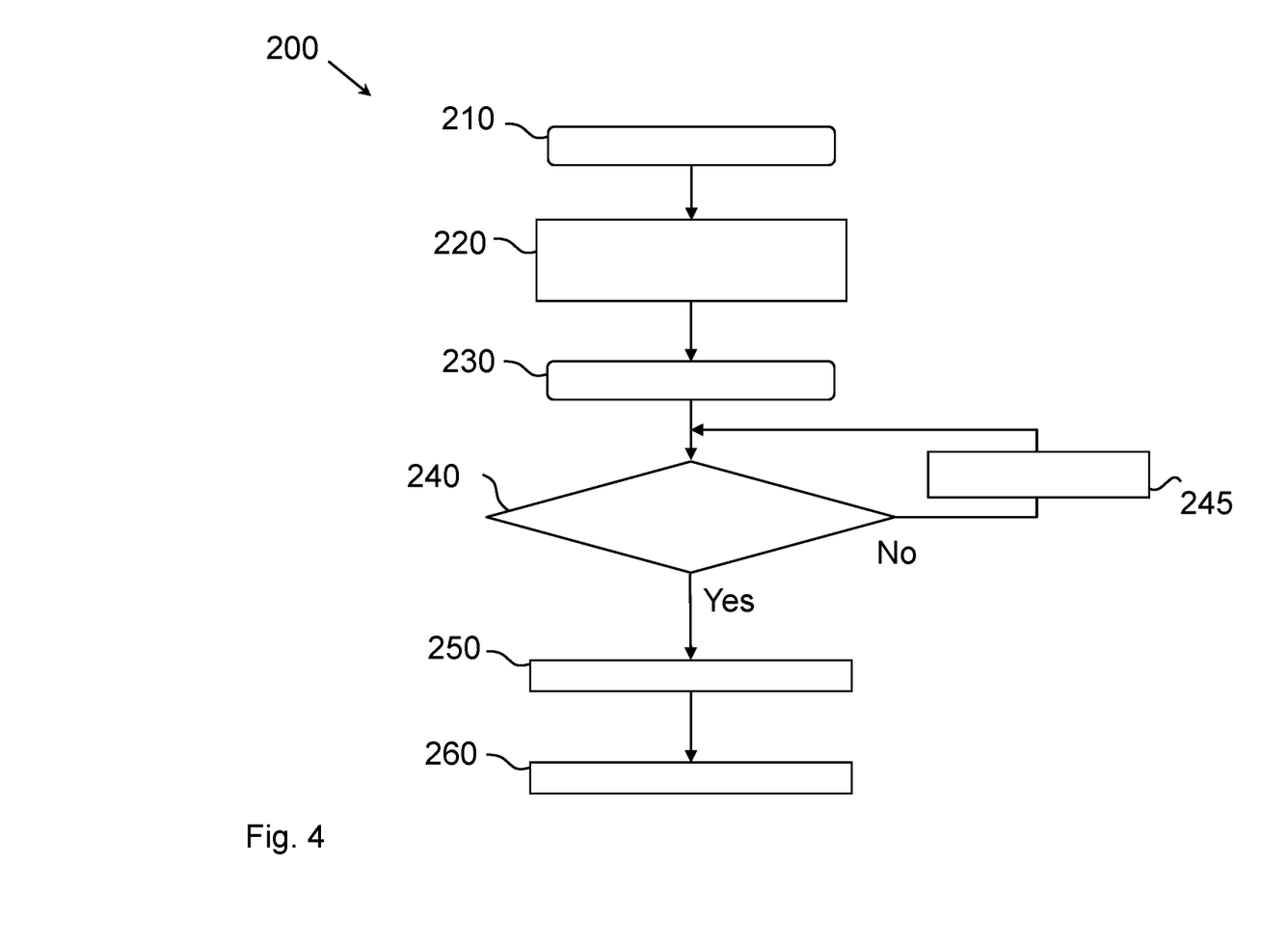
FIG. 4 shows a flow chart of a method for forming a device network according to one embodiment.

FIG. 4 shows a flow chart of a method for forming a device network according to one embodiment.

The method 200 for forming a device network or gateway allocation method according to FIG. 4 allows assigning the gateway devices 5 located in a room or a zone provided in the physical environment. The method 200 can be, in particular, applied consecutively to (e.g., one by one to) different network devices 5 such that eventually all network device 5 in the room are connected to respective gateways 7.

The method 200 according to FIG. 4 comprises a step 210 in which the position data of the gateways 7 are collected. The position data of the gateways 7 may be collected with a location device similar to one used in the method 100 above or method 300 below.

In step 220, the position of the center of the room is determined, in particular, based on the CAD data of the physical environment, and the distances between the center of the room and gateways 7 are calculated. The distances may be calculated based on the position data of the one or more gateway 7 collected by means of a location device similar to one used for determining location data of the network devices 5.

Based on the calculated distances between the gateways 7 and the center of the room, in step 230, the closest gateway 7 to the center of the room is determined.

In step 240, which is a decision diamond, it is determined whether the number of the network devices 5 already connected to the gateway 7 is smaller than a certain pre-defined maximum number. If, in step 240, it is determined that the consecutive number of the current network device is smaller than the average number of network devices 5 per gateway 7, then the method proceeds to the next step 250, in which the current network device 5 is assigned to the gateway 7 which has been determined as the closest gateway 7 to the center of the room.

If, in step 240, it is determined that the total number of the connected network devices 5 to the closest gateway 7 to the center of the room is not less than pre-defined maximum number, in step 245, then the next closest gateway 7 to the room center is determined based on the distances between the gateways 7 and the room center, calculated in step 220 above, and the network device 5 is assigned to it.

The steps 240, 245, and 250 may be repeatedly carried out, until eventually all network devices 5 in the room are allocated to gateways 7.

In step 260, the method 200 for forming a device network for the current room ends.

The method 200 allows to limit the number of network devices 5 assigned to a single gateway 7 such that the workload of gateway can be automatically equalized, resulting in an efficient 25 network.

Figure 5:
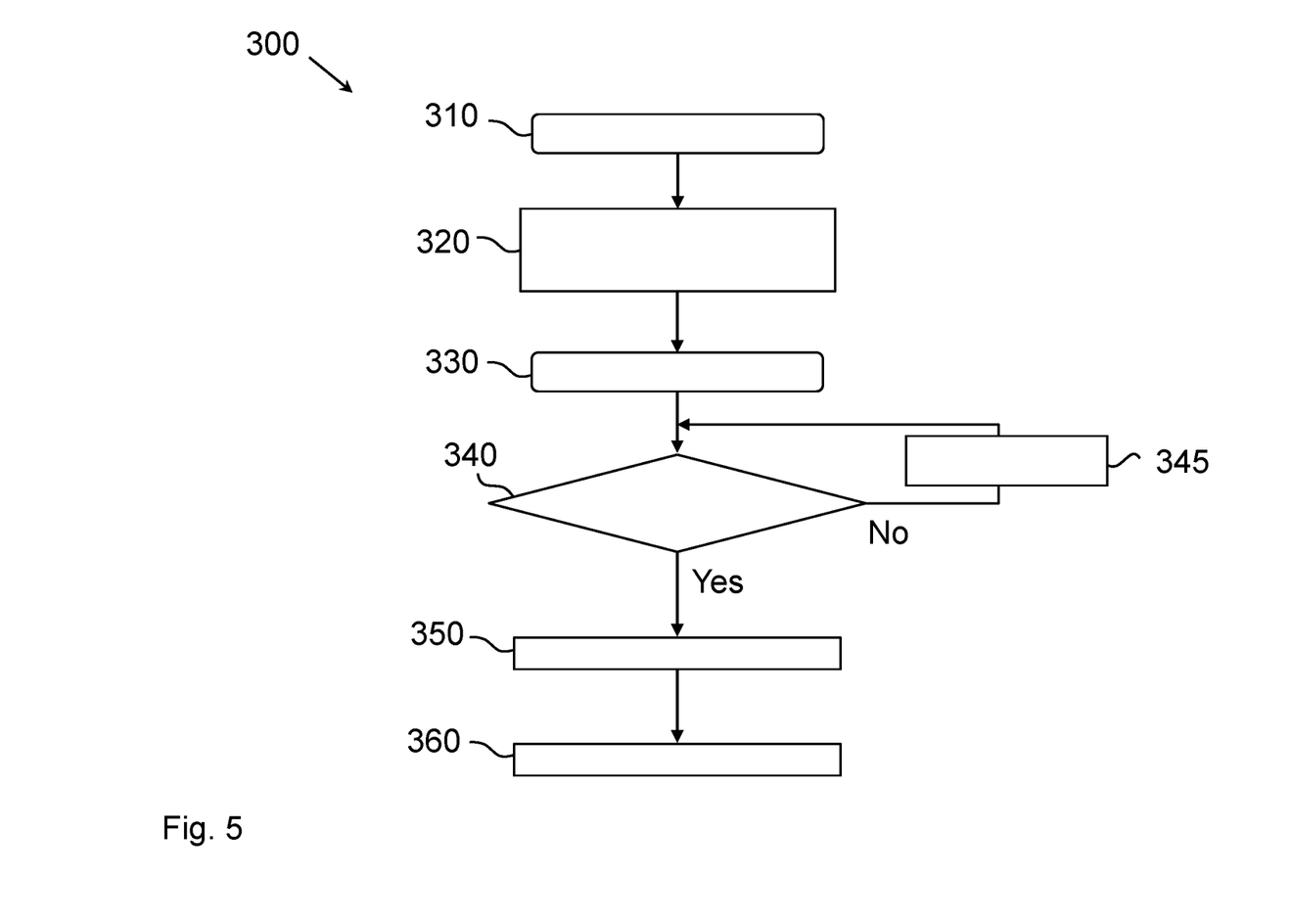
FIG. 5 shows a flow chart of a method for forming a device network according to another embodiment.

FIG. 5 shows a flow chart of a method for forming a device network according to another embodiment.

The method 300 according to FIG. 5 comprises a step 310 in which the position data of the network devices 5 and the gateways 7 in the environment are collected.

The position data of the network devices 5 and the gateways 7 may be collected with a location device similar to one used in the method 100 or 200 above.

In step 320, distances between a specific or current network device 5 and the available gateways 7 are calculated. In step 330, the gateway 7 closest to the current network device 5 is determined based on the calculated distances between the current network device 5 and the gateways 7.

In step 340, which is a decision diamond, it is determined whether the total number of network devices 5 already connected to the current gateway 7 is smaller than a pre-defined maximum number. The predefined maximum number may be defined based on the average number of network devices 5 per gateway 7, which is the overall number of the network devices 5 available in the physical environment 8 divided by the overall number of gateways 7 available in the entire environment 8.

If, in step 340, it is determined that the number of the network devices in the current room is smaller than the pre-defined maximum number, then in step 350 the network device 5 joins the closest gateway 7 determined in step 330.

If, in step 340, it is determined that the total number of network devices 5 already connected to the current gateway device is not smaller than the predefined maximum number, then the method proceeds to step 345 in which the network device 5 farthest from the current gateway 7 is determined. If the distance of the current network device 5 to the current gateway 7 is smaller than the distance from the farthest network device 5 to the current gateway 7, then the network device 5 with the farthest distance from the current gateway 7 is removed or disconnected from the current gateway 7, and the current network device 5 is connected to the current gateway 7 instead.

If the distance of the current network device 5 to the current gateway 7 is greater than the farthest distance, then the next closest gateway is determined and set as the current gateway to which the current device 5 is assigned.

In step 360, the method 300 for forming a device network ends.

Figure 6:
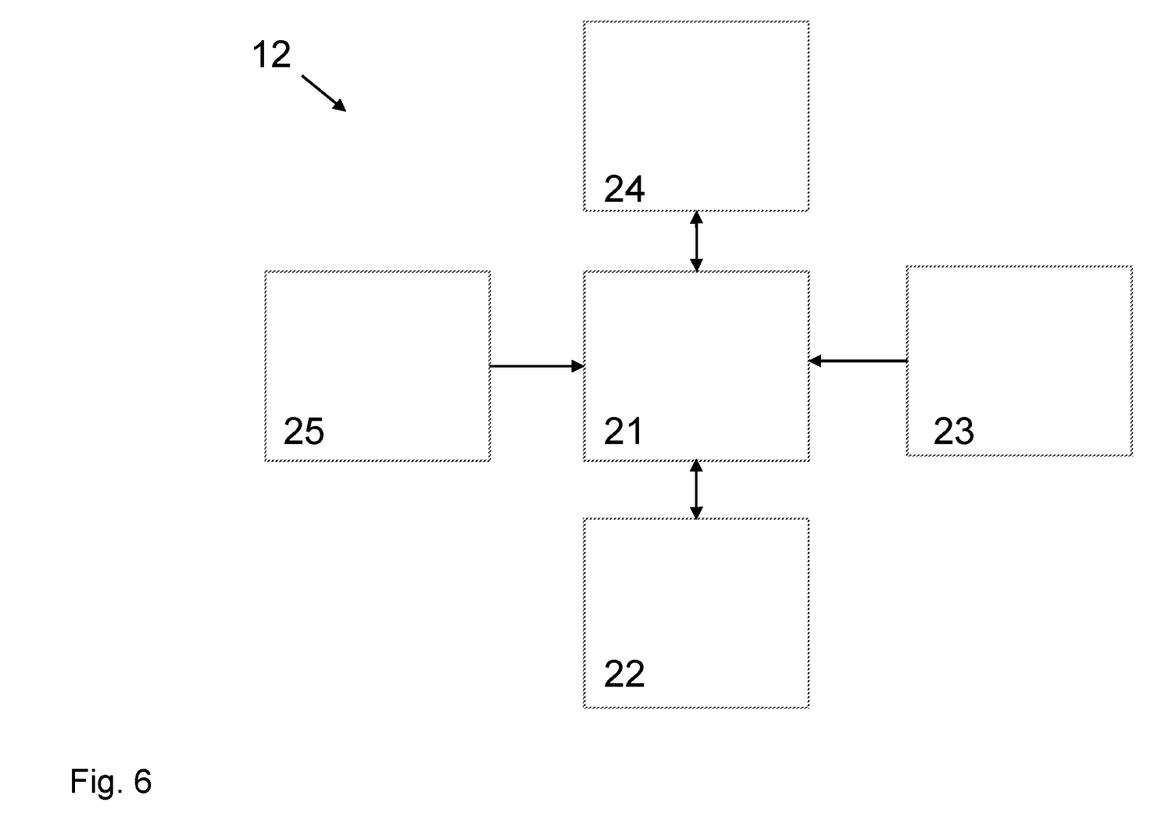
FIG. 6 shows a schematic structure of a location device according to an embodiment.

FIG. 6 shows a schematic structure of a location device according to an embodiment. The location device 12 comprises a processor 21 or central processing unit (CPU), a memory unit 22 for storing codes executable by the processor 21, and a QR-scanner 23 configured to scan QR-Codes (quick response code) of network devices 5. The location device 12 further comprises a communication interface 24 for establishing a wireless communication with the computer server 4 and a positioning tag 25 for determining the location of the location device 12 relative to the positioning bases. In the embodiment of FIG. 6, the communication interface 24 comprises a Wi-Fi (registered trademark) chip configured to establish the wireless communication according to the Wi-Fi standard.

Figure 7:
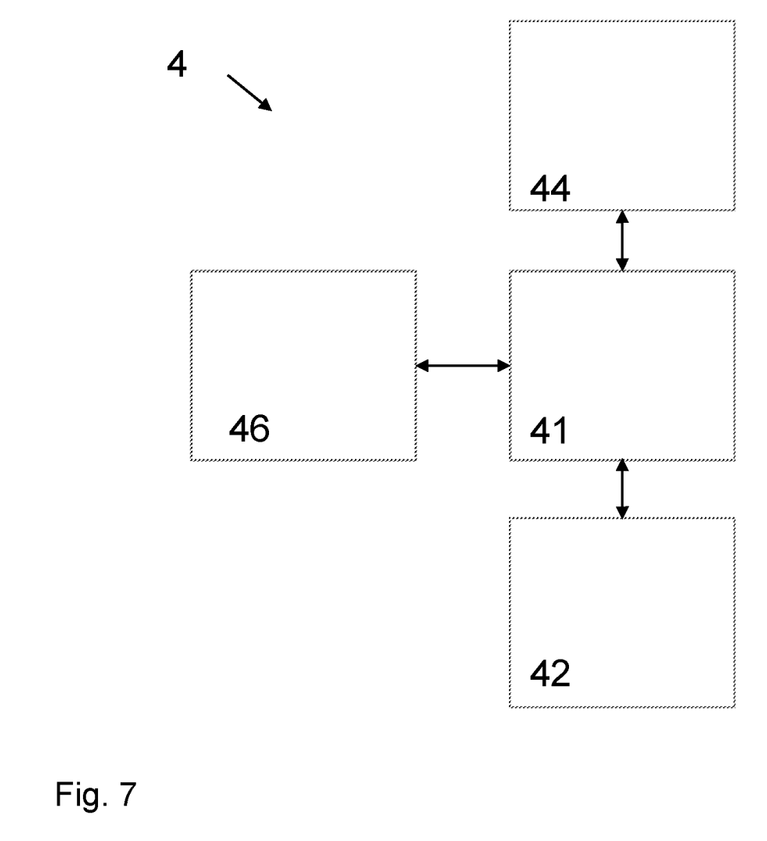
FIG. 7 shows a schematic overview of a computer server according to an embodiment.

FIG. 7 shows a schematic overview of a computer server according to an embodiment. The computer server 4 comprises a processor 41, a memory unit 42, a communication interface 44, and a user interface 46 (UI). The memory unit 42 is configured to store computer-readable instructions executable by the processor 41. The communication interface 44 is configured to establish a wireless communication with a location device 12 according to FIG. 6. The user interface 46 is configured to present information to the user and to receive inputs from the user for controlling the network devices 5. In an embodiment, the UI 46 comprises a touchscreen display which is configured to visualize the model of the physical environment and to receive user commands for controlling the network devices 5. In some embodiments, the UI 46 is configured such that the user can input the coordinates of the positioning bases.

The positioning bases may be arranged at specific locations with known coordinates in a lighting management environment, such as an office or a residential building. The positioning bases positioned at known locations can serve as a frame of reference or reference system for determining positions of the network devices 5 in the environment. In particular, the wireless communication between the positioning tag 25 of the location device 12 and the location bases can be used for collecting position data and for determining positions of the network devices 5. By measuring the respective distances from the positioning tag 25 of the location device 12 to the positioning bases, the location of the location device 12 relative to the positioning bases can be determined. Further, by measuring the distances between the positioning tag 25 and the communication bases, while the location device 12 is kept at one of the network devices 5, the distances between the respective network device 5 and the positioning bases can be determined.

The position data can be sent from the location device 12 over the Wi-Fi communication to the computer server 4 for further processing.

The QR-scanner 23 of the location device 12 can be used to read the QR-codes of the network devices 5. The QR-codes may comprise device information representing a unique ID number, manufacturer ID, specification data, etc.

After scanning a QR-code of a network device 5 by the QR-scanner 23 of the location device 12, the corresponding device information data may be sent over the Wi-Fi communication from the location device 12 to the computer server 4. Prior to sending to the computer server 4, the location data and/or device information data may be stored in the memory unit 22 and/or processed by the processor 21 of the location device 12.

The system 1 allows to collect the location data and the device information data of a plurality of network devices 5 at the computer server 4 by approaching individual network devices 5 and carrying out the steps of collecting and sending the location data and the device information data of individual network devices 5.

The device information data and the location data for the network devices 5 may be mapped by the computer server 4 to a model of the physical environment, such that the device information data of the network devices 5 is assigned to corresponding locations in the model of the physical environment, according to the positions of the network device 5.

In some embodiments, especially in case of large physical environments, like landscaped offices or production halls, the system 1 also may comprise one or more gateways or communication nodes connected with the computer server 4 and configured to individually address the network devices 5. In particular, the gateways may be configured to transfer control signals received from the computer server 4 over a communication bus to individual network devices 5. In some embodiments, the gateways are configured to wirelessly transfer the control signals to the individual network devices 5. The gateways may be assigned to separate control zones of the environment such that all network devices in a single zone are controlled over a single gateway. In some embodiments, the UI 46 is configured to indicate the separate control zones in the model of the environment and to separately control network devices in each control zone of the physical environment. By dividing the environment into control zones and separately controlling the control zones with respective gateways, the handling of large networks with many network devices distributed over larger spaces can be facilitated.

In some embodiments, the device management interface is configured to display a dashboard for displaying diagnostic parameters and/or network status information. The network status information may comprise status information of individual network devices 5 or global status of the network as a whole. In particular, the status information may comprise health status information of the network. The health status may comprise the ratio of the number of well-functioning network devices to total number of network devices.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

The invention claimed is:

1. A system for forming a device network with a plurality of network devices and a plurality of gateways in a physical environment, the system comprising:
 a computer server, wherein the plurality of network devices are controllable by the computer server over the plurality of gateways, the computer server comprising:
  a communication interface configured to send control signals to the plurality of gateways for assigning the plurality of network devices to the plurality of gateways;
  a processor; and
  a memory unit configured to store:
   position data of the plurality of gateways; and
   instructions executable by the processor to:
    select a network device out of the plurality of network devices;
    select a first gateway out of the plurality of gateways based on the position data;
    connect the selected network device to the first gateway, if a total number of the plurality of network devices connected to the first gateway does not exceed a predefined maximum number of network devices per gateway; and
    select a second gateway based on the position data and connect the selected network device to the second gateway if the total number of the plurality of network devices connected to the first gateway exceeds the predefined maximum number of network devices per gateway; and
 a location device for collecting position data for the plurality of network devices and the plurality of gateways, wherein the location device comprises:
  a processor,
  a positioning tag configured to collect the position data for determining positions of the plurality of network devices relative to at least one positioning base provided in the physical environment;
  a quick-response (QR)-scanner for collecting device information data representing individual properties of the plurality of network devices;
  a communication interface for communicating with the computer server; and
  a memory unit configured to store instructions executable by the processor to cause the processor to receive the position data from the positioning tag and the device information data from the QR-scanner and to instruct the communication interface to send the position data and the device information data to the computer server.

2. The system according to claim 1, wherein:
 the computer server further comprises a user interface (UI); and
 the memory unit of the computer server is further configured to store instructions executable by the processor to:

provide a model of the physical environment;
map the plurality of network devices to the model of the physical environment; and
display the model of the physical environment on the UI, the plurality of network devices being indicated by icons in the model of the physical environment.

3. The system according to claim 2, wherein at least one of:
the UI comprises an interactive user interface configured to control the plurality of network devices by selecting respective icons on the UI; and
the UI is configured to display diagnostic parameters indicating an operational state of the plurality of network devices.

4. The system according to claim 1, further comprising:
the at least one positioning base configured to be provided in the physical environment and configured to wirelessly communicate with the positioning tag of the location device for providing at least one of the position data of the plurality of network devices and the position data of the plurality of gateways.

5. The system according to claim 1, wherein the device network is self-equalizing in that network device connections and a current workload are able to be automatically distributed over the plurality of gateways.

6. The system according to claim 1, wherein the selected network device comprises a lamp or luminaire having at least one light parameter which is adjustable via the device network to achieve a target illumination of the physical environment.

7. A system for forming a device network with a plurality of network devices and a plurality of gateways in a physical environment, the system comprising:
a computer server, wherein the plurality of network devices are controllable by the computer server over the plurality of gateways, the computer server comprising:
a communication interface configured to send control signals to the plurality of gateways for assigning the plurality of network devices to the plurality of gateways;
a processor; and
a memory unit configured to store:
position data of the plurality of gateways; and
instructions executable by the processor to:
select a network device out of the plurality of network devices;
select a first gateway out of the plurality of gateways based on the position data;
connect the selected network device to the first gateway, if a total number of the plurality of network devices connected to the first gateway does not exceed a predefined maximum number of network devices per gateway; and
select a second gateway based on the position data and connect the selected network device to the second gateway if the total number of the plurality of network devices connected to the first gateway exceeds the predefined maximum number of network devices per gateway;
wherein:
the physical environment comprises at least one room with one or more network devices arranged in the at least one room; and
the memory unit is further configured to store instructions executable by the processor to:
determine a geometrical center of the at least one room; and
calculate distances between the plurality of gateways and the geometrical center of the at least one room based on the position data of the plurality of gateways, wherein:
a closest available gateway from the geometrical center of the at least one room is selected as the first gateway; and
a second closest available gateway from the geometrical center of the at least one room is selected as the second gateway.

8. The system according to claim 7, wherein the device network is self-equalizing in that network device connections and a current workload are able to be automatically distributed over the plurality of gateways.

9. The system according to claim 7, wherein:
the computer server further comprises a user interface (UI); and
the memory unit is further configured to store instructions executable by the processor to:
provide a model of the physical environment;
map the plurality of network devices to the model of the physical environment; and
display the model of the physical environment on the UI, the plurality of network devices being indicated by icons in the model of the physical environment.

10. The system according to claim 9, wherein at least one of:
the UI comprises an interactive user interface configured to control the plurality of network devices by selecting respective icons on the UI; and
the UI is configured to display diagnostic parameters indicating an operational state of the plurality of network devices.

11. The system according to claim 7, further comprising:
at least one positioning base configured to be provided in the physical environment and configured to wirelessly communicate with a positioning tag of a location device for providing the position data of the plurality of gateways.

12. The system according to claim 7, wherein the selected network device comprises a lamp or luminaire having at least one light parameter which is adjustable via the device network to achieve a target illumination of the physical environment.

13. A system for forming a device network with a plurality of network devices and a plurality of gateways in a physical environment, the system comprising:
a computer server, wherein the plurality of network devices are controllable by the computer server over the plurality of gateways, the computer server comprising:
a communication interface configured to send control signals to the plurality of gateways for assigning the plurality of network devices to the plurality of gateways;
a processor; and
a memory unit configured to store:
position data of the plurality of gateways; and
instructions executable by the processor to:
select a network device out of the plurality of network devices;
select a first gateway out of the plurality of gateways based on the position data;
connect the selected network device to the first gateway, if a total number of the plurality of network devices connected to the first gateway does not exceed a predefined maximum number of network devices per gateway; and select a second gateway based on the position data and connect the selected network device to the second gateway if the total number of the plurality of network devices connected to the first gateway exceeds the predefined maximum number of network devices per gateway;

wherein the memory unit is further configured to store instructions executable by the processor to:

collect position data of the plurality of network devices;

calculate a plurality of distances between the plurality of network devices and the plurality of gateways based on the position data of the plurality of network devices and the position data of the plurality of gateways, wherein the selecting of the first and the second gateways is based on the calculated plurality of distances between the plurality of network devices and the plurality of gateways;

determine, after selecting the first gateway and prior to selecting the second gateway, a farthest network device that is already connected to the first gateway; and replace the farthest network device by the selected network device if it is determined that a distance between the farthest network device and the first gateway is larger than a distance between the selected network device and the first gateway.

14. The system according to claim 13, wherein the device network is self-equalizing in that network device connections and a current workload are able to be automatically distributed over the plurality of gateways.

15. The system according to claim 13, wherein:

the computer server further comprises a user interface (UI); and the memory unit is further configured to store instructions executable by the processor to:

provide a model of the physical environment;

map the plurality of network devices to the model of the physical environment; and display the model of the physical environment on the UI, the plurality of network devices being indicated by icons in the model of the physical environment.

16. The system according to claim 15, wherein at least one of:

the UI comprises an interactive user interface configured to control the plurality of network devices by selecting respective icons on the UI; and the UI is configured to display diagnostic parameters indicating an operational state of the plurality of network devices.

17. The system according to claim 13, further comprising:

at least one positioning base configured to be provided in the physical environment and configured to wirelessly communicate with a positioning tag of a location device for providing at least one of the position data of the plurality of network devices and the position data of the plurality of gateways.

18. The system according to claim 13, wherein the selected network device comprises a lamp or luminaire having at least one light parameter which is adjustable via the device network to achieve a target illumination of the physical environment.

* * * * *